United States Patent [15] 3,680,674
Horstman [45] Aug. 1, 1972

[54] CENTRIFUGAL CLUTCH
[72] Inventor: Gilbert F. Horstman, 730 E. Huntington Dr., Monrovia, Calif. 91016
[22] Filed: June 22, 1970
[21] Appl. No.: 48,357

Related U.S. Application Data
[63] Continuation-in-part of Ser. No. 754,754, Aug. 19, 1968, abandoned.

[52] U.S. Cl........192/105 BA, 192/70.14, 192/103 B
[51] Int. Cl..............................................F16d 23/10
[58] Field of Search......192/105 BA, 105 CD, 103 B, 192/107 M, 70.14

[56] References Cited
UNITED STATES PATENTS
2,902,130  9/1959  Halberg et al. ............192/70.14
3,485,331  12/1969  Volker et al...............192/107 M
2,596,193  5/1952  Zieg..........................192/105 C
2,718,294  9/1955  Armstrong................192/105 B
2,396,637  3/1946  Brustle......................192/105 B Primary Examiner—Benjamin W. Wyche
Assistant Examiner—Randall Heald
Attorney—Fulwider, Patton, Rieber, Lee & Utecht

[57] ABSTRACT

A drive hub carries a sheet metal spider having integrally formed first and second sets of spaced arms shaped to slidably constrain a set of clutch shoes for radial movement into and out of engagement with a cylindrical drum. Springs normally bias the shoes toward radially inner positions against driving portions of the spider, the driving portions slidably engaging trailing ends of the shoes to cam the set of shoes into gradually increasing frictional engagement with the drum. An integral reinforcing flange on the drum prevents its distortion by the heat generated therein.

8 Claims, 8 Drawing Figures

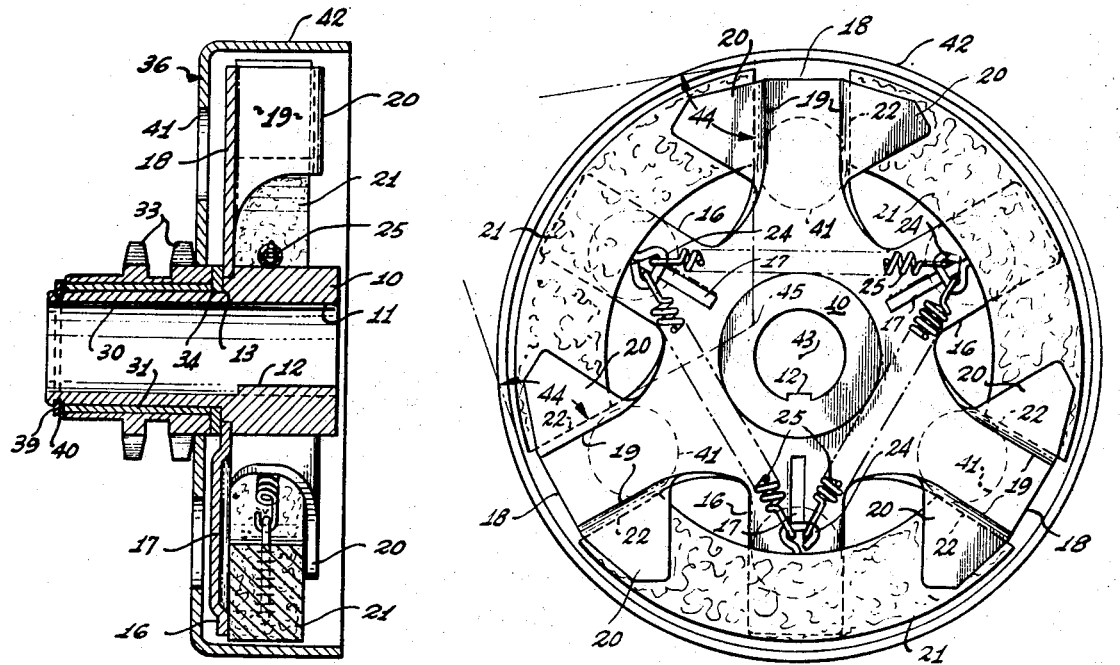

INVENTOR.
GILBERT F. HORSTMAN
BY Fulwider, Patton, Rieber,
Lee, and Utecht
ATTORNEYS 3,680,674

CENTRIFUGAL CLUTCH

This is a Continuation-in-Part of my application filed Aug. 19, 1968, Ser. No. 754,754, now abandoned.

BACKGROUND OF THE INVENTION

The present invention relates to mechanical friction clutches and, more specifically, centrifugal clutches.

Previously available centrifugal clutches are subject to excessive chatter, which indicates a vibrating engagement of the shoes with the clutch drum. This chatter not only causes undesirable uncontrollable slippage but, also results in torsional vibration of the driven and driving parts. As a result, shock is induced in the parts so that pins, rivets, hooks or clips in the clutch mechanism may shake loose or break, thus leading to a relatively short service life. By the same token, excessive heat may be generated, particularly in the drum, leading to bell-mouth deformation of the drum and out-of-roundness.

SUMMARY OF THE INVENTION

It is a general object of my invention to provide an improved centrifugal clutch to minimize or eliminate the previously mentioned and other deficiencies of the prior art devices. In the clutch of my invention, the driving hub to be connected to the flywheel or output shaft of an internal combustion engine, for example, carries a radially-extending spider having two distinct sets of arms adapted to slidably support a plurality of fibrous or metallic clutch shoes for radial movement towards and away from contact with a surrounding clutch drum. One set of the spider arms provides a pair of oppositely facing end seats for adjacent ends of a pair of the clutch shoes, the seat faces being arranged with a particular angular relationship with respect both to a tangent to the surrounding clutch drum and the axis of the drive shaft. Upon acceleration of the hub, the shoes are centrifugally urged outwardly, the trailing edge of each shoe sliding along the corresponding shoe seat. As a result of the orientation of the shoe seat and of the abutting surface of the trailing edge of the shoe, there is achieved a gradually increasing positive engagement of the shoes with the drum at all stages of clutching action, the shoes, in effect, being gradually cammed into driving engagement with the drum. In order to maintain roundness and prevent development of a bell-mouth in the drum due to the heat generated therein, the drum is integrally formed with a reinforcing flange at its open end. In a presently referred embodiment of the invention, the clutch shoes comprise hardened sintered steel having the advantages of permitting greater uniformity in size and weight of the shoes, greater strength and longer life, more positive engagement and the elimination of fading, as compared to fiber shoes, which advantages may practically be realized with a hardened steel drum with a flange reinforcement. Additionally, the combination of the reinforced drum and steel shoes provides a clutch that will accept more horsepower in a clutch assembly of smaller diameter while, at the same time, very greatly increasing service life. The clutch involves a reduced number of parts of symmetrical configuration whereby the clutch is bidirectional in action.

BRIEF DESCRIPTION OF THE DRAWING

FIG. 1 is a sectional view of one embodiment of my centrifugal clutch, the view being taken on a diametral plane;

FIG. 2 is a plan view looking into the clutch drum;

FIG. 3 is a somewhat schematic partial sectional view showing the interaction of a single clutch shoe with the clutch drum;

FIG. 4 is an exploded perspective view of the parts of the device;

DESCRIPTION OF THE PREFERRED EMBODIMENT

Figure 5:
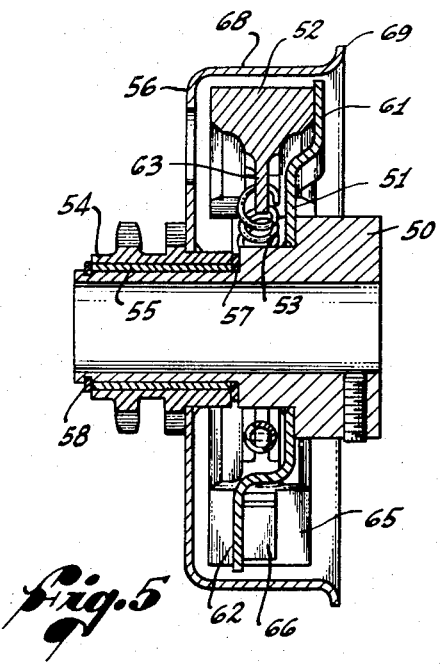
FIG. 5 is a sectional view of a presently preferred embodiment of the centrifugal clutch, the view being taken on a diametral plane.

Referring to FIG. 1, the clutch includes a hollow drive hub 10 formed with a through bore 11 in which a key 12 is formed by means of which the hub may be connected to the output shaft of an engine, motor or other source of torque. Externally, the hub 10 is formed with a circumferentially extending shoulder 13 adapted to receive a center hole that is formed in a central web portion 14 of a spider generally indicated by the numeral 15. The spider is formed from sheet metal and is press-fitted, brazed or otherwise rigidly secured to the hub 10 for the corotation therewith.

Referring to FIG. 4, the web portion 14 of the spider develops into a plurality, three for example, of radially extending arms 16 that are equally angularly spaced apart, each of these arms being formed integrally with a radially-extending stiffener groove 17. The spider also develops into a plurality, three for example, of second arms 18 which also are equally angularly spaced apart. The arrangement of the two sets of arms is such that each of the arms 16 and 18 is equidistantly spaced between an adjacent pair of the arms 16 or 18, as the case may be. At its outer end, each arm 18 develops into a channel shaped end portion having an opposed pair of axially extending walls 19, each of which terminates in a radially disposed flange 20. All of the flanges 20 are arranged in a plane normal to the plane of the arms 16 but spaced therefrom by the axial dimension of the channel wall portions 19.

The clutch includes a plurality of shoes 21, three such shoes in the illustrated case, which are molded into the shape of the arcuate segments illustrated in FIG. 4. Thus, the shoes may be made of asbestos and cloth fibers with copper strands, if desired, for strength, the whole being bound together by a suitable resin. As is indicated in FIG. 1, the shoes 21 are of such axial dimension as to be receivable, with sliding clearance, within the axial space between the plane of the radial arms 16 and the flanges 20 of the channel arms 18.

Referring to FIG. 2, it will be seen that each shoe 21 is of an arcuate length such that opposite, preferably flat, ends of the shoe are normally seated against seats 22, each of which comprises an outside face of one of the channel walls 19 of the spider 15. As there is a small radius at the junction of each flange 20 and the adjacent channel wall 19, each shoe 21 at the corresponding corner is relieved, as by means of a chamfer 23, in order to provide clearance, as shown in FIG. 4. Each of the shoes 21 is of substantial radial depth or dimension and, at the midpoint of its inner edge, each shoe receives an eyelet screw 24 to which one end of a pair of springs 25 is connected, there being three such springs in the illustrated case. Thus, the shoes 21 and springs 25 are mutually interconnected, the springs defining a triangular aperture within which the major diameter of the hub 10 is disposed.

Referring to FIG. 1, the drive hub 10 is formed with a reduced diameter portion 30 that is journalled within a bushing 31 that, in turn, is mounted with a sprocket hub 32 having an adjacent pair of sprockets 33 formed integrally therewith. A spacer washer 34 is mounted on the drive hub 10, at the shoulder defined between the major and minor diameter portions of the hub, to provide clearance between the spider 15 and a radially extending web portion 35 of a drum designated generally by a numeral 36. As indicated in FIG. 1, a center hole in the web portion 35 of the drum is press-fitted, brazed or otherwise affixed to the sprocket hub 32 adjacent the sprocket gears 33. In order to hold the spider assembly and drum assembly in assembled relation, the outer end of the minor diameter portion 30 of the drive hub is formed with a circumferentially extending groove 38 to receive a snap ring 39 beneath which a fiber washer 40 is mounted, the drum assembly thus being held against axial displacement between the fiber washer and the spacer washer 34.

The web portion 35 of the drum 36 is formed with a plurality of circularly spaced apart holes 41 for the passage of cooling air into and out of the space confined by a cylindrical drum portion 42, the spider assembly acting to displace air when rotating.

When the spider 15 is at rest, the springs 25 normally bias the shoes 21 to the radially retracted positions indicated in FIG. 2. Thus, each shoe 21 at its opposite ends is seated in a clockwise facing seat 22 and on a counterclockwise facing seat 22, in which retracted position there is a radial clearance between the outer edge of the shoe and the confronting surface of the drum 42.

Upon sufficient torque being applied to the drive hub 10, the shoes 21 are centrifugally forced outwardly, thus moving from the seated dotted outline position indicated in FIG. 3 to the fully engaged radially outer position indicated in solid outline, torque thus being transferred from the shoes to the drum 42. Referring to FIG. 2, it will be observed that both the clockwise facing and counterclockwise facing seats 22 lie in planes offset from the axis of rotation 43 of the clutch and, preferably, include an acute angle with respect to a plane tangent to the inner surface of the drum 42, as indicated by the angle 44. The pair of seats 22 also include an angle having an apex 45 that is offset from the axis of rotation 43. With this arrangement, there is assured a positive frictional engagement of each shoe 21 with the drum 42, without chatter, and in a manner to minimize the transfer of torsional vibration between the spindle assembly and the drum assembly.

Referring to FIG. 3 and assuming a clockwise torque being applied to the shoe 21 by the clockwise facing seat 22, the shoe slides radially outwardly on supporting arm 16 and flanges 20. At the same time, the trailing end of the shoe 21, i.e., the left-hand end in FIG. 3, slides outwardly along the clockwise facing seat, the other end of the shoe 21 drawing away from the counterclockwise facing seat 22. Thus, the edge of the shoe 21 positioned at the angle 44 is positively wedged between the clockwise facing seat 22 and the inner surface of the drum 42 and into positive contact of the outer edge of the shoe with the inner surface of the drum.

At the same time, since all of the shoes 21 are mutually interconnected by the springs 25, the wedging engagement of each shoe reinforces the positive engagement of all other shoes since the counterclockwise displacement of the shoes relative to their counterclockwise seats 22 is mutually reinforced by the action of the springs 25. Nevertheless, as each shoe 21 has its leading edge displaced from the counterclockwise facing seat 22, each shoe has a degree of freedom in the circular direction independently of all other shoes. According, if for some reason any individual shoe commences to chatter, the springs 25 connected to that shoe will tend to dampen the chattering vibration and so inhibit the setting up of sympathetic chattering vibrations in the other shoes.

The presently preferred embodiment of the invention is shown is FIGS. 5 through 8. This form is particularly adapted to utilize clutch shoes of a metallic material within a hardened drum without consequent distortion of the drum as a result of the greater heat generated therein. With this arrangement, the clutch of this invention can be reduced in size while, at the same time, increasing its load capacity and greatly improving its durability. As the two clutches are generally similar, the form of FIGS. 5 through 8 will not be described in detail except with respect to those features distinguishing it from the first described form of the invention.

The spider assembly comprises a drive hub 50 that rigidly mounts a spider 51 carrying a plurality of clutch shoes 52 normally biased to a retracted position by a like plurality of springs 53. The drum assembly comprises a sprocket hub 54 internally mounting a bushing 55, within which the drive hub 50 is journalled, and externally rigidly mounting a drum 56. A fiber washer 57 is interposed between confronting ends of the hubs 50 and 54 and the two assemblies are held together by means of a snap ring 58 mounted in an annular groove 59 on the outer end of the drive hub 50.

The spider 51 is formed into a first set of equally angularly spaced apart radially extending arms 61 and a second set of equally spaced radial arms 62. These two sets of arms are offset to opposite sides of the plane of the central web portion of the spider 51.

Figure 7:
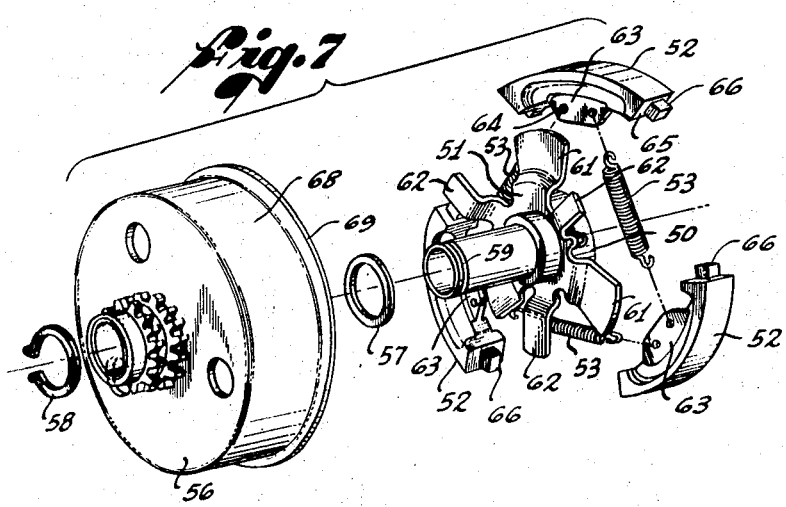
FIG. 7 is an exploded perspective view of the parts of the clutch of FIG. 5.

The shoes 52 are made of hardened sintered steel in the form of the arcuate segments best seen in FIG. 7. Thus, the outer peripheral working surface of each shoe 52 is relatively wide, while its radially inner portion comprises a thinner beam-like rib integrally formed with a radially inwardly extending tab portion 63. Each of these tabs is formed with a spaced pair of holes 64 by means of which the hook ends of the set of springs 53 may be interconnected between adjacent shoes 52. Each shoe 52 at each of its opposite ends terminates in a flat face 65, each of these faces being integrally formed with an arcuately extending projection or boss 66, of smaller cross-section than the face 65.

When the shoes and spider are in assembled relationship, each arm 61 bears against a mid-portion of a corresponding shoe 52, along one side of the shoe, while each second arm 62 is interposed between adjacent ends of a pair of the shoes 52 and bearing against that side of a pair of the bosses 66 in opposition to the first arm 61. It will be observed that opposite radially extending edges of each of the second arms 62 at the same time bear against adjacent ends 65 of a pair of the shoes 52 and that the angle included by the ends 65 of a shoe 52 is the same as the angle included between corresponding edges of the second arms 62.

Referring to FIG. 5, it will be observed that the sprocket hub 54 projects inwardly of the drum 56 to such an extent that its inner end terminates within the space bounded by the shoes 52. This extra length of bearing on the inside of the drum gives balanced support to the drum for more uniform distribution of the load. The drum 56 is formed out of sheet metal with a cylindrical drum portion 68 whose open end terminates in a radially outwardly projecting circumferential flange 69. The drum is formed into this configuration and subsequently hardened to provide an internal surface of greater hardness than the hardness of the shoes 52. During hardening, the peripheral flange 69 maintains the roundness of the formed cylindrical drum portion 68 and in the use of the clutch the flange 69 also serves to maintain such roundness and to prevent bellmouth distortion of the drum as a result of the great heat which may be generated in certain phases of the clutching action.

Figure 6:
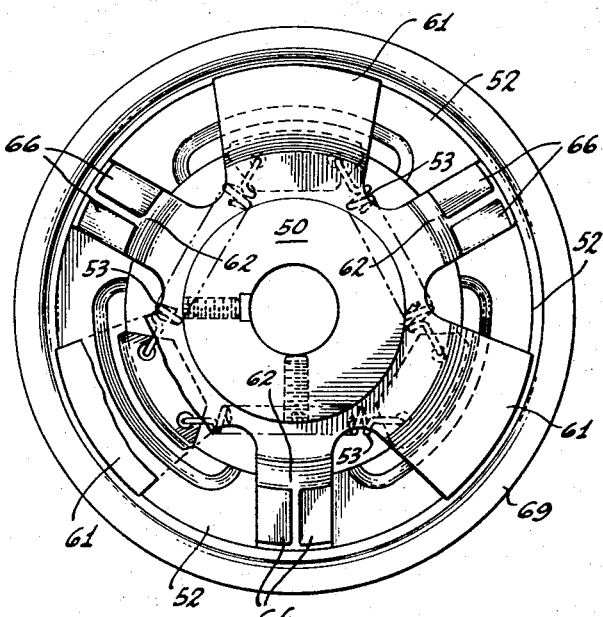
FIG. 6 is a plan view looking into the clutch drum.
Figure 8:
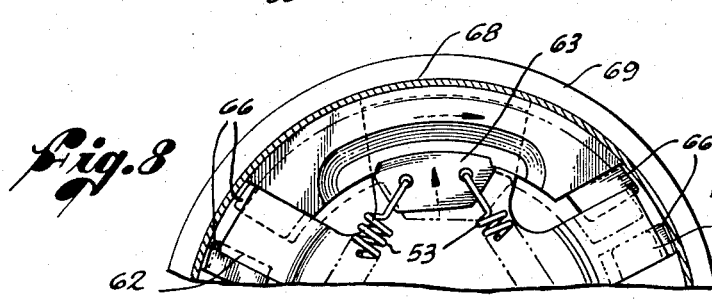
FIG. 8 is a partial sectional view showing the interaction of a single clutch shoe with the clutch drum, in the embodiment of FIG. 5.

FIG. 6 shows the spring retracted position of the shoes 52 relative to the spider 51. Thus, each shoe 52 has its opposite end faces 65 in flat engagement with confronting angularly related edges of a pair of the second arms 62, with radial clearance between the outer periphery of the shoe 52 and the inner surface of the drum 68. Referring to FIG. 8, and assuming clockwise rotation of the spider 51, each shoe 52 is centrifugally forced outwardly towards clutch engagement with the drum portion 68. In thus moving outwardly, the trailing end 65 of the shoe 52 slides radially outwardly along the corresponding edge of a second arm 62 until the outermost corner of the shoe becomes frictionally engaged with the drum, in the same manner as previously described with respect to the first embodiment of the invention. By virtue of this cam-like action, translating rotary motion of the spider into radially outward movement of the shoes along the edges of the second arms 62, a gradually increasing positive engagement between the shoes and drum is attained, without chattering.

The metallic shoes 52, as compared to fiber shoes, generate more heat in the drum of the clutch. However, I have found that despite the greater generation of heat, the flange 69 will maintain the drum roundness and prevent bell-mouth distortion so efficiently that the clutch may be reduced in size but, nevertheless, will accept more horsepower or have greater load capacity with a disproportionate increase in durability.

While the invention has been set forth and described above in detail, it will be understood by those skilled in the art that it may be embodied in other forms. Accordingly, I do mean to be limited to the precise forms illustrated and described but only by the spirit and scope of the following claims.

I claim:
1. A centrifugal clutch comprising:
   a drum;
   a drive hub coaxially rotatably mounted in said drum;
   a spider affixed to said hub and having a plurality of radially outwardly extending arms;
   at least three clutch shoes of arcuate configuration mounted on said spider to be arranged in a circumferential series of equally circularly spaced apart shoes around said hub;
   said arms of said spider comprising a first series of equally circularly spaced apart arms arranged to slidably bear against mid-portions of one axial end of said shoes and a second set of equally circularly spaced apart arms in the same plane as said first arms and having outer end portions of channel-shaped configuration each disposed between adjacent ends of a pair of said shoes to define a pair of seats for each of said shoes;
   each of said channel-shaped portions terminating in a pair of oppositely circularly extending flanges disposed in a plane parallel to the plane of said first arms and slidably engaging the other axial ends of said shoes;
   said arms of said spider holding said shoes against axial displacement relative to said hub and slidably supporting said shoes for movement radially into and out of contact with said drum, said pair of seats for each of said shoes supporting said shoes in a radially retracted position with radial clearance between outer edges of said shoes and said drum, said seats being adapted to transmit torque from said hub to said shoes.

2. A clutch as in claim 1 in which:
   each of said shoes, in radially retracted position, has opposite ends on a clockwise facing and a counterclockwise facing pair of said seats,
   said clockwise and counterclockwise facing seats being oriented substantially radially in directions to include an angle having its apex offset from the axis of rotation of said hub,
   each of said clockwise and counterclockwise facing seats also defining an acute angle with respect to a tangent to said drum at the intersection of the projected plane of each said seat with said drum to wedgingly receive an end of said shoe.

3. A clutch as in claim 1 that includes:
   a plurality of springs each of which is interconnected at opposite ends to a radially inner edge of an adjacent pair of said shoes, said springs defining an aperture through which said hub is received, said springs normally biasing said shoes into radially retracted positions on said seats.

4. A clutch as in claim 1 in which:
   said drum includes a radially disposed web portion formed with a plurality of vent holes through which cooling air may be drawn upon rotation of said spider, said circularly spaced apart arms of said spider being effective to displace air within said drum.

5. A centrifugal clutch comprising:

a clutch drum;

a drive hub coaxially rotatably mounted in said drum;

a spider formed of a rigid sheet material that is coaxially rigidly affixed to said hub to be rotatably positioned within said drum;

said spider being shaped and adapted to define at least three pairs of opposed seats for opposite ends of clutch shoes to be mounted in said spider;

at least three circularly arranged clutch shoes, each of said shoes comprising an arcuate segment and each being mounted in said spider with opposite ends of the shoes in slidable engagement with the corresponding pair of said opposed seats;

a plurality of spring means each of which is connected at opposite ends to an adjacent pair of said shoes at radially inner edges of said shoes;

said spring means normally biasing said shoes into radially retracted positions in which each shoe has opposite ends abutting said pair of seats with radial clearance between the radially outer edge of said shoe and said drum;

said spring means being adapted to yield to the centrifugal force of said shoes, upon rotation of said hub, for permitting radial expansion of said shoes into frictional contact with said drum;

said spider including a plurality of radially extending arms alternate ones of which slidably bear against one axial end of said shoes and the others of which slidably bear against the other axial ends of said shoes, alternate ones of said arms having channel-shaped outer portions disposed between adjacent ends of a pair of said shoes, said seats comprising axially extending portions of said channel-shaped portions.

6. In a centrifugal clutch the combination comprising:

a cylindrical drum having hub means adapted for connection to a load;

a drive hub coaxially rotatably mounted within said drum in coaxial alignment with said hub means of said drum;

a spider coaxially mounted on said drive hub and formed with first and second sets of arms in circumferentially spaced apart relationship;

a plurality of arcuately shaped clutch shoes, each having slidable contact with one of said first sets of arms and with terminal end portions of a pair of said second sets of arms;

a plurality of springs interconnected to said plurality of clutch shoes to bias said shoes radially inwardly of said spider;

each of said second arms being interposed between adjacent ends of a pair of said shoes and having its outer terminal end portion defining a pair of oppositely circularly facing seats against which said adjacent shoe ends are biased by said springs, each of said outer terminal end portions also including surface areas in parallel offset relationship to said first set of arms in order to slidably support said shoes therebetween.

7. A centrifugal clutch as in claim 6 in which said first set of arms is arranged to slidably bear against midportions of one axial end of said shoes and said second set of arms extend radially outwardly in the same plane as said first arms and have outer end portions of channel-shaped configuration disposed between adjacent ends of a pair of said shoes to define said pair of seats, each of said channel-shaped portions terminating in a pair of oppositely circularly extending flanges disposed in a plane parallel to the plane of said first arms and slidably engaging the other axial ends of said shoes.

8. A centrifugal clutch as in claim 6 in which each of said shoes is formed with opposite end faces having integrally formed projections defining shoulders with said end faces;

said second set of arms having radially outer terminal end portions laterally offset from the plane of radially outer terminal end portions of said first arms by a distance less than the axial dimension of said shoes;

said outer ends of said second arms having one side slidably engaging sides of an adjacent pair of said projections oppositely to said first arms, and having opposite edges defining a pair of said seats slidably abutting adjacent end faces of an adjacent pair of said shoes.

* * * * *